INVENTOR
JOSEPH PEPO SALTIEL
BY
ATTORNEYS

# United States Patent Office 3,482,743
Patented Dec. 9, 1969

3,482,743
MACHINE FOR AUTOMATICALLY MARKING, CUTTING AND COUNTING SMALL ITEMS OF WEARING APPAREL SUCH AS HOSIERY
Joseph Pepo Saltiel, Saint-Quentin, France, assignor to Wimbledon Organization Ltd., Luxembourg, Luxembourg, a company of Luxembourg
Filed Dec. 26, 1968, Ser. No. 787,090
Claims priority, application France, Dec. 29, 1967, 134,505; Dec. 12, 1968, 178,009
Int. Cl. A41h 1/06
U.S. Cl. 223—1        13 Claims

ABSTRACT OF THE DISCLOSURE

The machine comprises two testing forms adapted to receive stockings mounted on a rotary support adapted to occupy two diametrally opposed positions, a cutting member movable in translation and a marking member adapted to carry out on a stocking, for each aforesaid position of said support, cutting to a determined length and application of a mark respectively, said support, said cutting member and the marking member being driven in synchronism.

---

The present invention essentially relates to an automatic machine for marking, cutting and counting hosiery articles such as stockings intended for use in the manufacture of small items of clothing or apparel such as tights or the like.

During the manufacture of small-clothes or tights, the stockings coming from a knitting machine are cut to a determined length and this cutting is simultaneously marked by application of a marking to the stocking and finally the stockings thus treated are counted, these stockings subsequently being sewn by pairs or possibly together with a gusset to make tights or like garments or apparel.

Heretofore this operative step of manufacturing tights had been carried out manually; the workwoman takes a stocking, slips or pulls it over a forming block or mould, marks it at the desired location of the cutting by means of a pencil, cuts it to a given length by means of a pair of scissors and presses on the finger-key of a counter in order to allow for checking or control of the production which amounts depending upon the process actually used to fifty dozens of stockings per day and per workwoman.

The object of the invention is to carry out these marking, cutting and counting operations or process steps fully automatically.

According to a characterizing feature of the invention, the machine comprises a pair of forming or shaping blocks at least intended to receive the stockings and mounted on a rotary support, a carrier or like holder adapted to occupy two diametrally opposite positions, a cutting member movable in translation and a marking member, provided for effecting upon a stocking, for each aforesaid position of the support, respectively a cutting to a determined length and the application of a mark.

According to a further feature of the invention, said support is rotated by means of a driving device controlled by a pneumatically operated distributor or the like controlled by a starting or change-over valve operable by the operator.

According to still another feature of the invention, said support is locked in each one of said positions by means of a finger or the like engaging a cogged, notched or slotted wheel rigidly connected to said support for rotating therewith, said finger being operated by a double-acting actuator fed or supplied by a pneumatically operated distributor or the like controlled on the one hand by said starting valve and on the other hand by a return control valve operated by said driving device.

According to another characterizing feature of the invention, said cutting member consists of a shear means or the like supported by a carriage or slide-rest movable in translation and driven by a double-acting actuator fed or supplied from a pneumatically operated distributor or the like controlled on the one hand by said driving device and on the other hand by a return control valve, adjustable in position and operated by said carriage or slide-rest.

According to another feature of the invention, said marking member consists of a plug or the like carried by a swinging arm operated by a double-acting actuator fed by an air-operated distributor or the like controlled by said starting valve.

It is apparent that the machine elements effecting the various operating process steps to be carried out are controlled automatically and synchronously.

According to still another characterizing feature of the invention, the supply circuit of the actuator driving said carriage or slide-rest comprises at least one safety valve operated by said locking means.

According to still a further feature of the invention, said starting valve is connected to a main pressure fluid circuit through the medium of a safety valve operated by said carriage or slide-rest.

These valves provide a reliable fool-proof operation of the machine without the possibility in particular of any wrong move on the part of the operator.

Still according to the invention, the driving device of said support consists of an electric motor comprising in its feed circuit an electromagnetic valve or the like supplied or energized by said distributor.

Further characterizing features and advantages of the invention will appear as the following description proceeds.

In the accompanying drawings given by way of example only:

Figure 1:
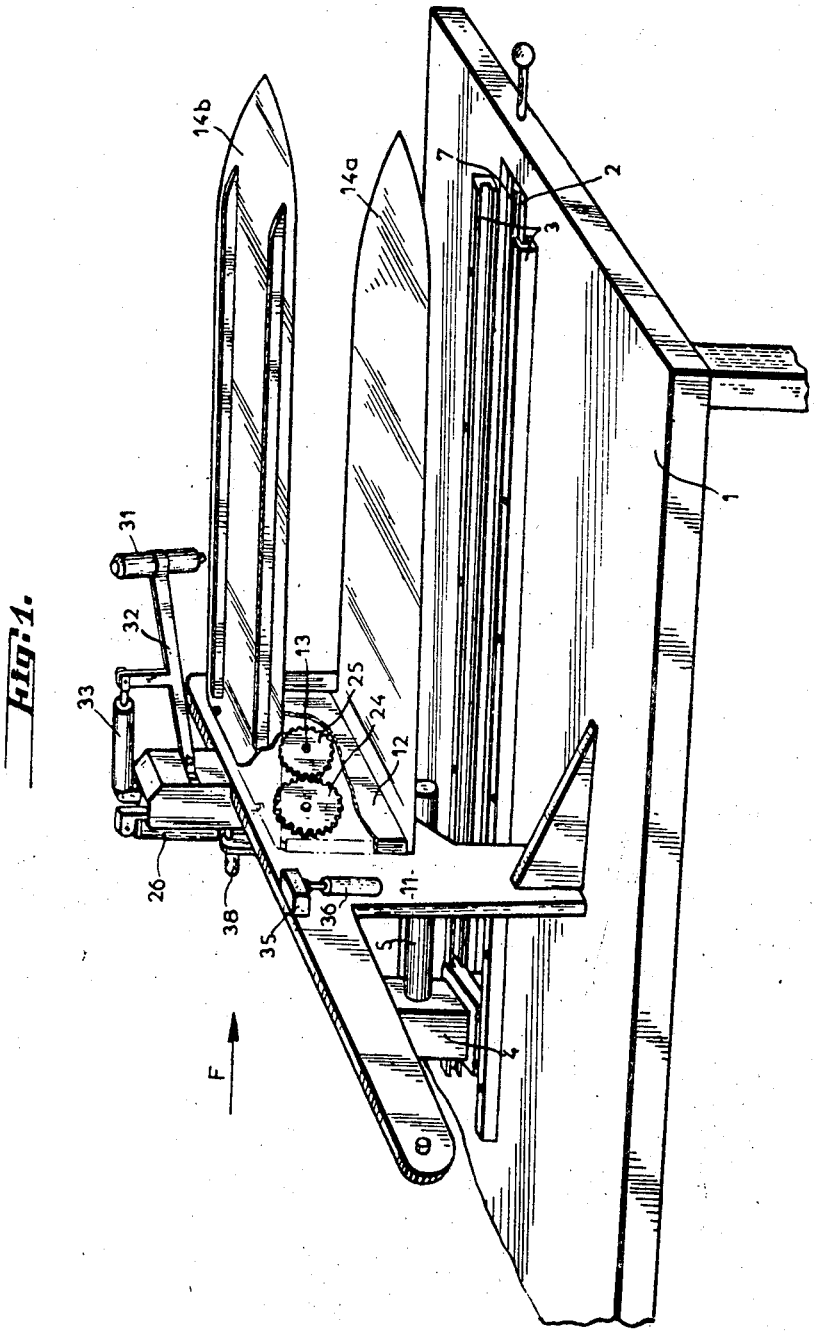
FIGURE 1 is a perspective view of a machine according to a first embodiment of the invention.
Figure 2:
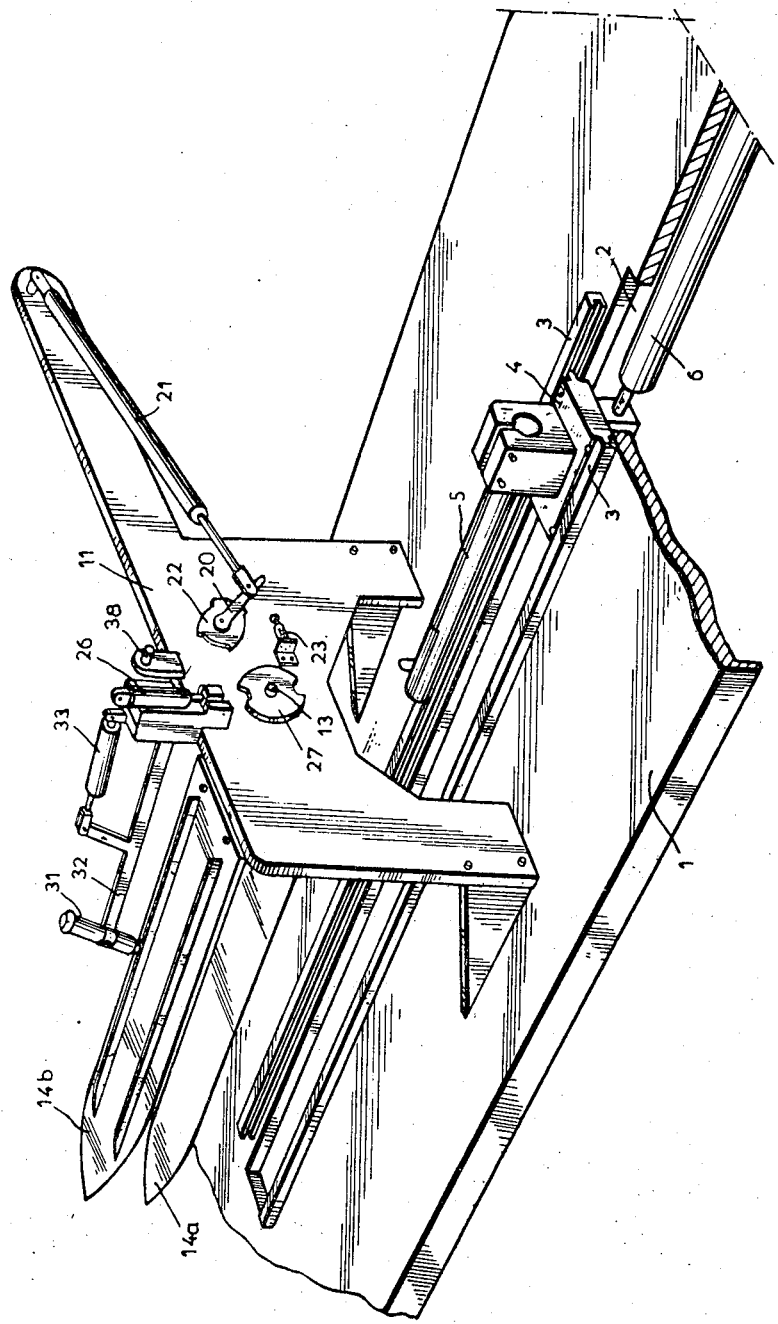
FIGURE 2 shows said machine as seen in the direction of the arrow F of FIGURE 1.

According to the embodiment shown in FIGURES 1 and 2, the machine essentially comprises a table 1 provided with a longitudinal slot 2 on the edges of which are disposed rails or like guide tracks or runways 3. On the rails 3 is displaceable according to a back and forth or reciprocating movement, a carriage or slide-rest 4 carrying a cutting shear means 5, said carriage or slide-rest being driven in translation on the rails by a double-acting actuator 6. A limit or stop valve (not shown), rigidly connected to a hand-adjustable or operable sliding member 7, enables one to trip, to trigger or to initiate the return motion of the carriage 4 when the latter impinges on said stop valve.

On the table 1 is secured a transverse bridge 11 which straddles the slot 2 and on which is rotatably mounted, about an axis or shaft 13, a bracket or like support 12 which carries a pair of forming or shaping blocks 14a and 14b of generally substantially flat configuration and both arranged in parallel relation to the axis 13, these forming or shaping blocks being adapted to receive the stockings (not shown).

The driving device for rotating the support 12 consists of a double-acting actuator 21 pivotally mounted at one of its ends on the bridge 11 and driving, in an alternating swinging movement, an arm 20 rigidly connected to a wheel or pawl or click wheel 22 rotatably mounted on the bridge 11. A limit or stop valve 23 trips or triggers the return stroke of the actuator 21. The ratchet wheel 22 is rigidly connected with a toothed gear wheel 24 meshing with a toothed gear wheel 25 the diameter of which is equal to the half of the diameter of the gear wheel 24, this gear wheel 25 being keyed on the shaft or axis 13 of the bracket 12. Each forth and back motion of the actuator 21 rotates by a quarter of a revolution the ratchet wheel 22 which in turn through gear 25 support 12 by half a revolution.

A double-acting actuator 26, also mounted on the bridge 11, drives or moves a finger or the like 28 cooperating with a cogged, notched or slotted wheel 27 rigidly connected to the axis 13, this finger enabling the locking of the support 12 in two diametrally opposite positions, both forming or shaping blocks being, for these two positions, positioned so that their plane is horizontal, each one of them alternately occupying the high position and the low position.

A marking plug 31, secured to the end of a lever 32, pivotally mounted on the bridge 11 and disposed above the forming or shaping blocks, is operated by a double-acting actuator 33.

Finally a stocking-counting device, also mounted on the bridge 11, consists of a counter 35 operated by a single-acting actuator 36.

The operation of the machine is as follows: The operator slips or pulls the stocking over the forming or shaping block 14b which is in the high position and presses on the push piece of the starting valve 38; the marking of the stocking is automatically effected by the plug 31 which moves down onto the stocking. When moving up again, the plug 31 causes the rotation by 180° of the forming or shaping blocks 14a, 14b which are then locked horizontally against movement. The forming or shaping block which at the beginning of the process step was in the high position 14b moves down to the low position 14a. The forming or shaping blocks being locked, the shear means 5, carrying out a uniform straight reciprocating motion, cuts the stocking to a determined length, this length being adjustable by means of the sliding member 7. A recording of the production is carried out by the counter 35 at the same time as the cutting and automatically.

While the cutting is effected on the forming or shaping position held in the low position 14a, the operator starts again to slip or pull another stocking over the forming or shaping block moved to the high position 14b and the cycle begins again.

The marking of the stocking serves mainly the purpose to mark the starting of the gusset seam or sewing step (on tights or small-clothes where such a gusset is provided) and is effected either on the right or on the left so as to define the type of stocking for the assembling step.

It should be pointed out with respect to the shear means 5, that this shear means is preferably an electric thermo-wire, i.e. an electrically heated metal wire, which offers the advantage, when cutting nylon or another synthetic material of the stocking, to fuse or weld it at the same time, thereby removing any risk of unknitting; this shear means 5 may however also consist of a burner or a razor blade, a chopper or like knife, a cutting tool or any other means enabling a cutting.

Figure 3:
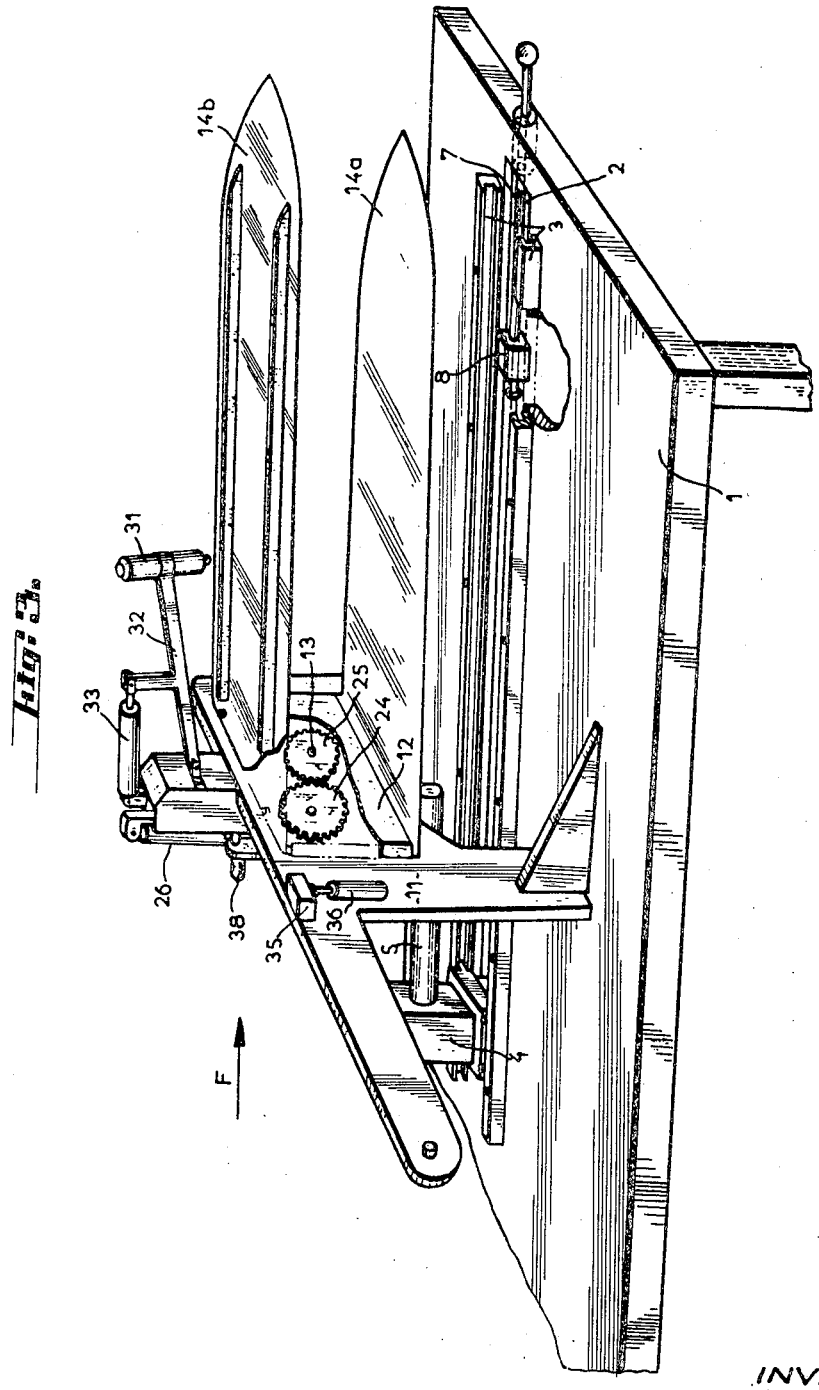
FIGURES 3 and 4 are as FIGURES 1 and 2, perspective views of a machine according to a second embodiment of the invention.
Figure 4:
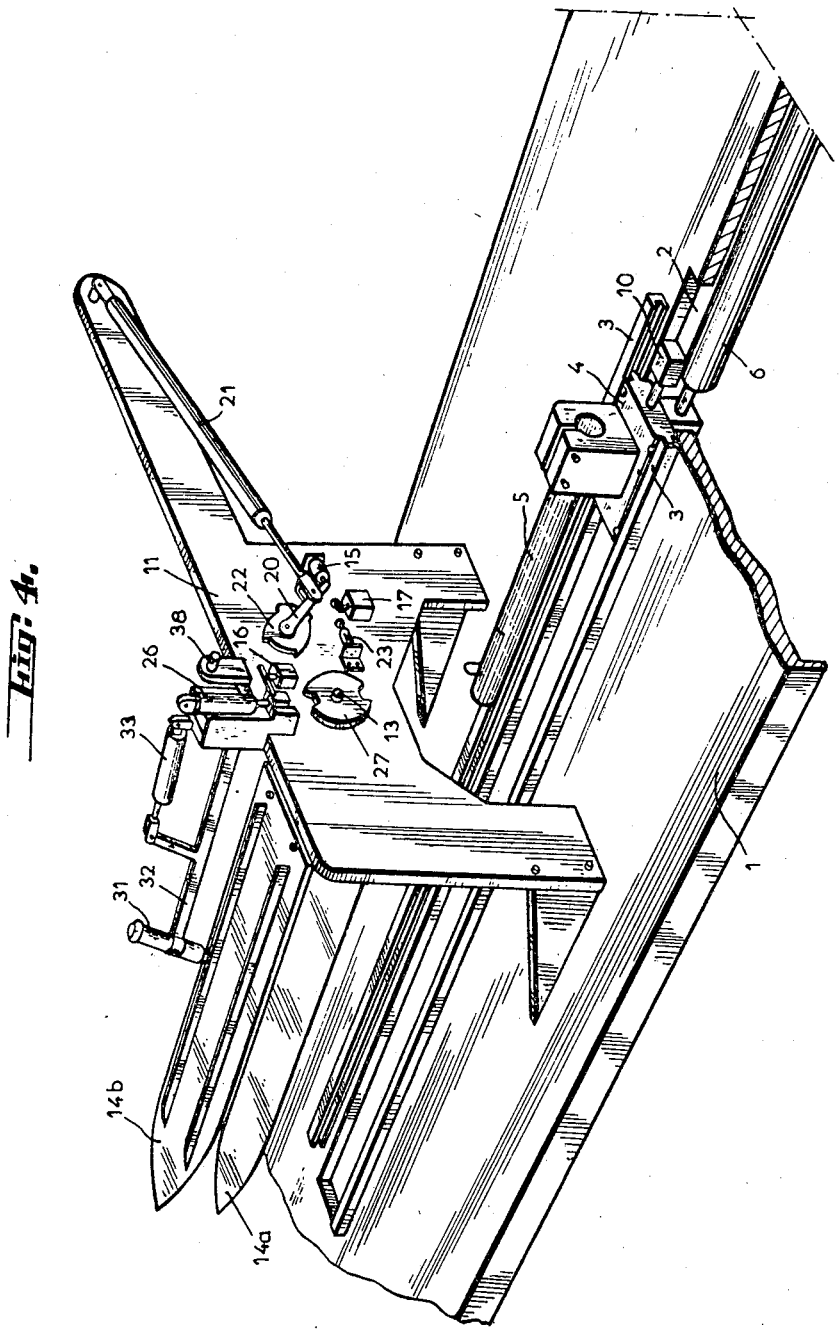
Figure 5:
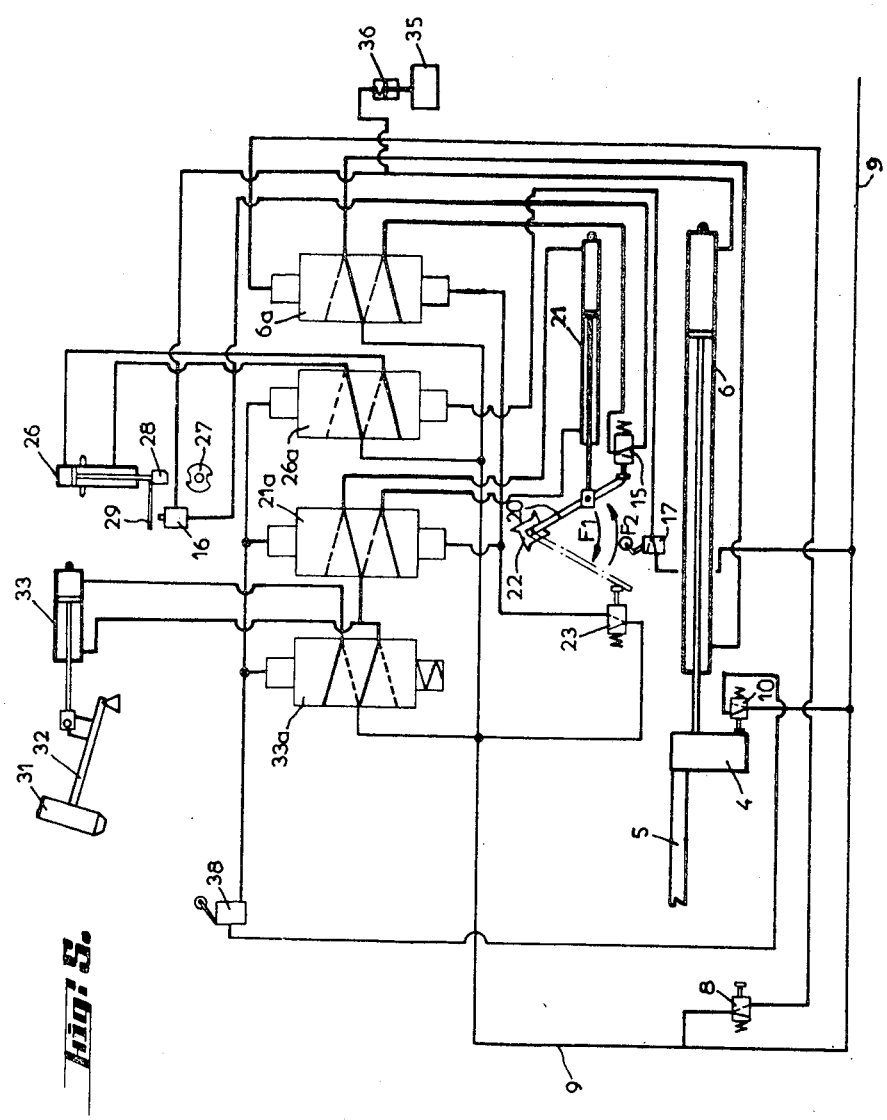
FIGURE 5 shows the pneumatic control circuit diagram of the machine illustrated in FIGURES 3 and 4.

According to the embodiment shown in FIGURES 3 to 5, wherein the same reference numerals designate the same elements as in FIGURES 1 and 2, the double-acting actuators 6, 21, 26 and 33 are fed or energized by a distributor 6a, 21a, 26a and 33a, respectively, each one of these distributors being itself fed with pressure fluid by a main supply circuit 9. The distributors 6a, 26a and 33a are directly connected to this circuit whereas the distributor 21a is connected thereto through the medium of the distributor 33a.

Each one of the actuators 21, 26 and 33 is fed or energized directly by the corresponding distributor for both of its directions of displacement. The actuator 6 is on the contrary directly supplied or energized by its distributor for a single direction of displacement, i.e. that corresponding to its retraction and it is fed for the other directional displacement, corresponding to its extension, through the medium of two series-connected safety valves 15 and 16 actuated respectively by the arm 20 and by a rod or the like 29, integral with the locking finger 28. The actuator 36 for the counter 35 is also fed by the circuit operating the outward extension of the actuator 6.

The distributor 6a is controlled on the one hand by the valve 23 operated by the arm 20 and on the other hand by a valve 8 rigidly connected to the sliding member 7, hence adjustable in position. The valves 23 and 8 are both connected to the circuit 9. The valve 23 controls the outward extensional movement of the actuator 6, i.e. the displacement in translation of the carriage or slide-rest 4 from the right to the left (when looking at FIGURE 5), whereas the valve 8 controls the retraction or inward motion of the actuator 6, i.e. the translatory movement from left to right of the carriage or slide-rest 4. The distributors 21a, 26a, 33a are all controlled by the starting valve 38 which is connected to the main circuit 9 through the medium of a safety valve 10 actuated by the carriage 4 and kept open when the latter occupies its right end position (when looking at FIGURE 5), that is its rest position.

The distributor 21a is controlled in addition by the valve 23 which also controls the distributor 6a as mentioned hereinabove.

The distributor 26a is controlled by a unidirectionally operated valve 17 connected to the circuit 9 and actuated by the arm 20.

The distributor 33a is a distributor acted upon by a return spring which restores or brings it back automatically to its initial or outgoing position upon release or discontinuance of the control pressure.

The operation of the machine is as follows.

The actuator 6 is assumed to be in a fully retracted position, i.e. the carriage 4 is in the right end position (shown in FIGURE 5) and keeps the safety valve 10 open. When the operator, after having placed a stocking on the upper forming or shaping block, wants to start the machine, she presses on the starting valve 38 thereby causing a control pulse to be applied to the distributors 33a, 21a and 26a. Under the action of this pulse, the distributor 33a feeds or energizes the double-acting actuator 33 in the direction corresponding to the lowering of the marking member 31a onto the stocking. The distributor 33a which is acted upon by a return spring, moves back to its initial position as soon as the action of the control pulse has vanished, so that it then feeds the double-acting actuator 33a in the opposite direction corresponding to the raising or lifting motion of the marking member 31.

This same pulse controls the distributors 21a and 26a, the latter then feeding the double-acting actuator 26 in the direction corresponding to the upward sliding motion of the finger 28 which then releases or disengages the cogged or notched wheel 27, whereas the rod 29 releases or disengages the valve 16 which closes. After a slight delay due to the fact that it is fed through the medium of the distributor 33a when the latter has moved back to its initial position, the distributor 21a feeds in turn the double-acting actuator 21 in the direction corresponding to the rotary drive of the ratchet wheel 22 (designated by the arrow $F_1$ in FIGURE 5) thereby causing through the medium of the gear wheels 24 and 25, the rotation of the support or holder 12. The arm 20 leaves the position shown in solid lines in FIGURE 5 and releases or disengages the valve 15 which closes.

When the actuator 21 reaches the end of its stroke, i.e. when the arm 20 is in the left end position shown in dash-dotted lines, it presses on the valve 23, so that a control pressure is applied to the distributors 21a and 6a. The distributor 21a reverses its position and controls the return or backward motion of the double-acting actuator 21 which returns or moves back the arm 20 while swinging it in the direction shown by the arrow $F_2$. While thus moving, the arm 20 operates the unidirectionally operated valve 17 which supplies a control pressure to the distributor 26a, which reverses its position and feeds the double-acting actuator 26 in the direction corresponding to the lowering of the finger 28 and to its engagement with the cogged or notched wheel 27. In this position of the finger 28, the rod 29 presses on the valve 16 thereby allowing the passage or flow of the fluid.

When the actuator 21 has reached its fully retracted position, the arm 20, which is again in the position shown in FIGURE 5, presses on the safety valve 15 which also allows the passage or flow of fluid. In view of the opening of the valves 15 and 16, the actuator 6 is fed or energized in the direction corresponding to the displacement from right to left of the carriage 4, the shear means 5 effecting the cutting of the stocking. At the same time, the actuaor 36 is fed or energized and causes the counter 35 to advance or move forward by one unity. As soon as the carriage 4 has left its right end position, it releases or disengages the safety valve 10 which cuts off or breaks the communication between the circuit 9 and the starting valve 38, so that any faulty or wrong operation is avoided. The right to left movement of the carriage 4 keeps on until it meets the valve 8 which then applies a control pressure to the distributor 6a. The latter reverses its position and feeds or energizes the double-acting actuator 6 in the direction corresponding to the return or backward motion of the carriage, i.e. to its displacement from left to right. When the carriage has again reached its right end position, it operates the valve 10 to make the starting valve 38 communicate with the circuit 9, so that a new operating cycle may start again.

Figure 6:
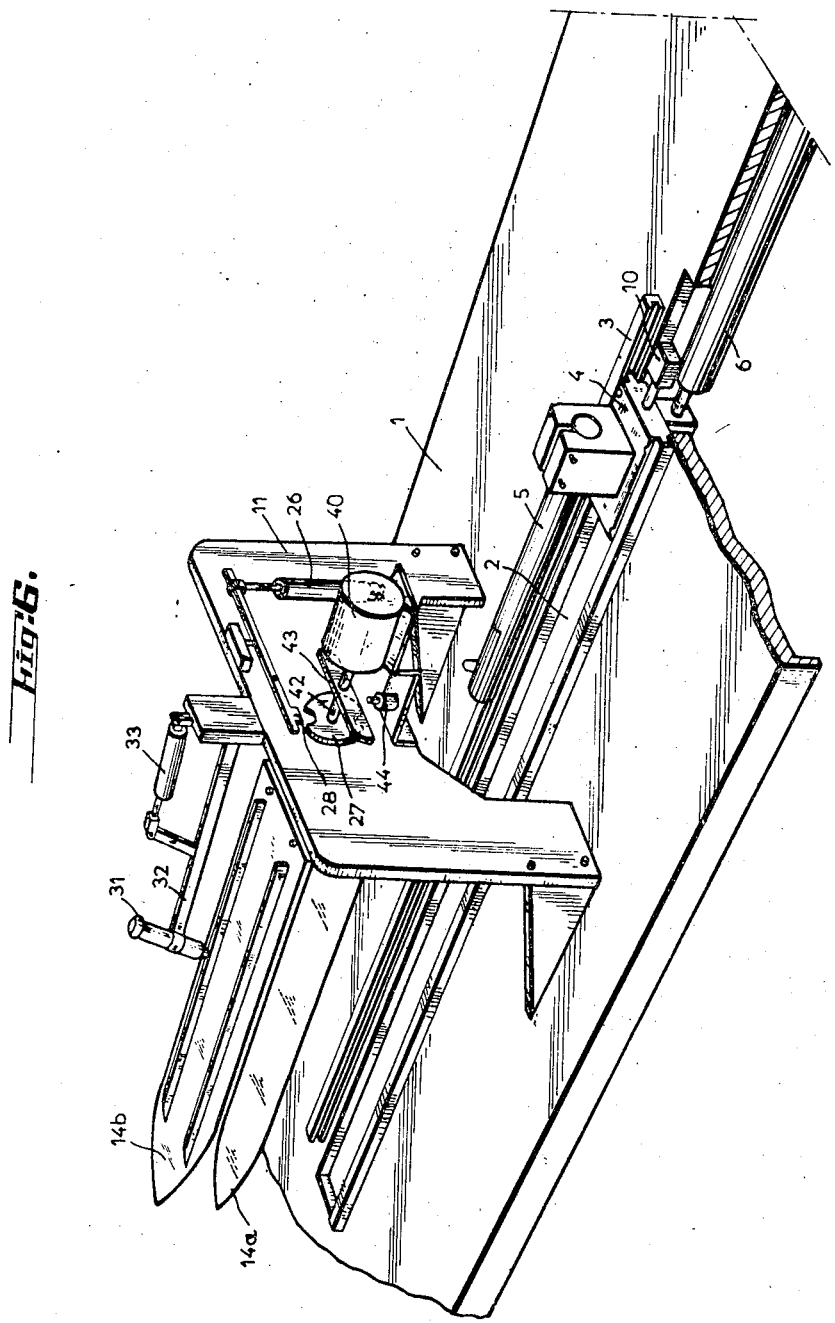
FIGURE 6 is a perspective view of a machine according to a third embodiment.
Figure 7:
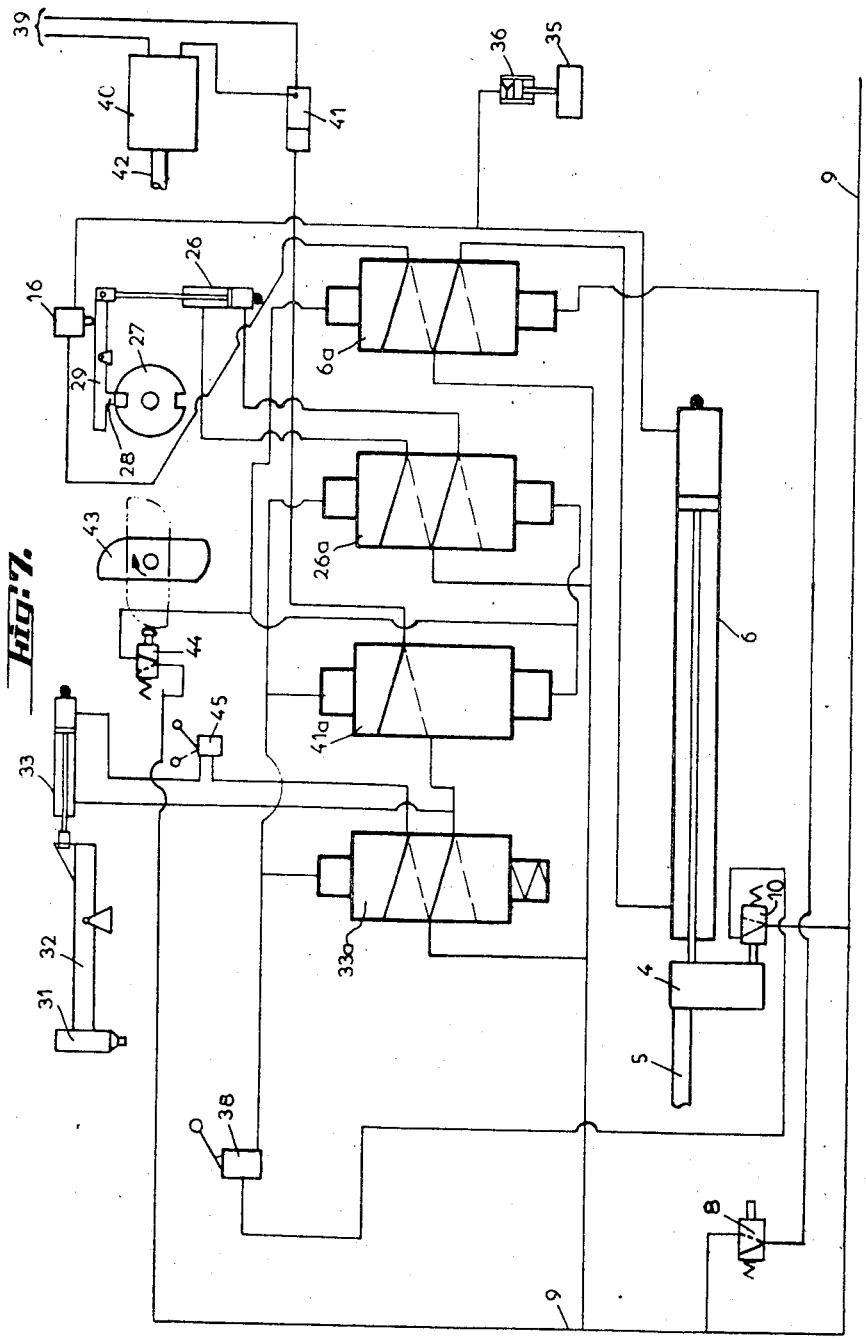
FIGURE 7 shows the pneumatic control circuit diagram of the machine illustrated in FIGURE 6.

In FIGURES 6 and 7 is shown a further embodiment of the machine according to the invention wherein the driving device for rotating the support 12 consists of a motor 40 comprising an electromagnetic valve 41 included in its feed circuit 39. This electromagnetic valve 41 is fed by a distributor 41a which replaces the distributor 21a of the preceding embodiment. The distributor 41a is controlled, like the distributor 21a, by the pulse delivered by the starting valve 38. On the shaft 42 of the motor 40 is keyed a finger 43 which operates a valve 44 connected to the general feed circuit 9, this valve controlling the actuators 41a, 26a and 6a. A hand-operable valve 45, inserted in the circuit of the actuator 33, enables to cut out or disconnect the marking device at will or selectively.

The machine elements, other than the driving device, are identical with those of the embodiment shown in FIGURES 3 to 5.

The operation of this machine is as follows. The carriage 4 is assumed to be in the position shown in FIGURE 7 and the finger 43 in the position shown in dash-dotted lines on this same figure. When the operator presses on the starting valve 38, the control pulse is as in the preceding case effective to lower the marking device 31 which returns to its high position upon the return of the distributor 33a to its initial position. The starting pulse also causes through the medium of the distributor 26a, the disengagement of the finger 28 from the cogged or notched wheel 27 and the closing of the safety valve 16. Under the influence of this same pulse, the distributor 41a feeds the electromagnetic valve 41 which closes or completes the electric feed circuit of the motor 40 which is caused to rotate. After a short besides adjustable period of time, the electromagnetic valve 41 returns, under biasing action of a calibrated return spring, to its original position thereby cutting off the energizing of the motor 40. The latter however keeps on rotating under the influence of its inertia. As soon as the finger 43 has left the position shown in dash-dotted lines, it releases or disengages the valve 44 which then controls the distributor 41a which returns to its initial or first position and the distributor 26a which also moves back to its initial position and feeds or energizes the actuator 26 in the direction corresponding to the engagement of the finger 28 with the cogged or notched wheel 27, this engagement being effected when a notch moves to a position in front of this finger. At this time, the lever 29 opens the safety valve 16 which allows the passage or flow of fluid. The valve 44 also controls the distributor 6a which, as soon as the valve 16 is open, feeds or energizes the double-acting actuator 6 in the direction corresponding to the displacement of the carriage 4 from right to left until the latter meets the valve 8 which operates its return. As in the preceding case, the safety valve 10 cuts off the feeding of the starting valve 38 during the translatory motion of the carriage 4.

It should be understood that the invention is not limited to the embodiments described and shown which have been given by way of illustration only. In particular, it comprises all the means forming technical equivalents of the means described as well as their combinations when same are carried out within the gist and the scope of the invention.

What is claimed is:

1. A machine for marking, cutting and counting hosiery articles such as stockings comprising a rotary support solid with a shaft, at least two testing forms adapted to receive said stockings, said testing forms being mounted on said support and arranged parallel to said shaft, driving means for driving said support in rotation between two diametrally opposed stopping angular positions, a cutting member movable in translation along said testing forms, driving means for imparting a reciprocal motion to said cutting member, an oscillating marking member, driving means for imparting an oscillating motion to said marking member, said cutting member and said marking member being adapted to carry out on a stocking, for each aforesaid position of said support, a cutting to a determined length and the applying of a marking mark respectively, and pneumatic means for synchronously actuating said support driving means, said cutting member driving means and said marking member driving means.

2. A machine according to claim 1, wherein said pneumatic means comprise a pressure fluid supply circuit, an operator-responsive starting valve in said pressure circuit and a first distributor for controlling said support driving means, said distributor being monitored by said starting valve.

3. A machine according to claim 2, comprising a notched wheel connected to said support for rotating therewith, a locking member for engaging said notched wheel in each one of the aforesaid positions of said support, a double-acting actuator for operating said locking member, a return control valve in said pressure fluid circuit and a second distributor controlling said actuator, said distributor being monitored on the one hand by said starting valve and on the other hand by said return control valve.

4. A machine according to claim 3, wherein said cutting member driving means is a double-acting actuator, said pneumatic means comprising a third distributor for controlling said actuator and an adjustable return control valve, actuated by said cutting member, said distributor being monitored on the one hand by said support driving means and on the other hand by said return control valve.

5. A machine according to claim 4, wherein said marking member driving means is a double-acting actuator, said pneumatic means comprising a fourth distributor for controlling said actuator, said distributor being monitored by said starting valve.

6. A machine according to claim 4, wherein said cutting member driving actuator comprises a feeding circuit having at least one safety valve operated by said locking member.

7. A machine according to claim 4, wherein said pressure fluid circuit comprises a safety valve controlling said starting valve and operated by said cutting member.

8. A machine according to claim 5, wherein said second, third and fourth distributors are directly connected to said pressure fluid supply circuit whereas said first distributor is connected to said circuit through the medium of said fourth distributor.

9. A machine according to claim 6, further comprising a counting member and a single-acting actuator for operating said counting member said actuator being connected to the aforesaid feeding circuit of the cutting member driving actuator.

10. A machine according to claim 2, wherein said support driving means comprises a ratchet wheel and a pawl, an oscillating arm rigidly connected to said ratchet wheel, a double-acting actuator for operating said arm and fed by said first distributor, and a return control valve operated by said arm and monitoring said first distributor.

11. A machine according to claim 8, wherein said support driving means comprises an electric motor having an energizing circuit, and an electromagnetic valve inserted in said energizing circuit and fed by said first distributor.

12. A machine according to claim 11, wherein said electromagnetic valve is provided to cut off the energizing circuit of said motor after a determined operating time.

13. A machine according to claim 12, comprising a finger connected to said motor to rotate therewith and a valve actuated by said finger, said valve controlling said first, second and third distributors.

References Cited

UNITED STATES PATENTS

| | | | |
|---|---|---|---|
| 2,742,204 | 4/1956 | Kruglick | 223—1 |
| 2,954,906 | 10/1960 | Lamade et al. | 223—1 |
| 3,097,770 | 7/1963 | Garrou | 223—1 |

MERVIN STEIN, Primary Examiner

G. V. LARKIN, Assistant Examiner